March 26, 1929.   W. J. THUERMAN   1,707,204
DRIVE AND POWER TRANSMITTING CHAIN
Filed March 27, 1928   2 Sheets-Sheet 1
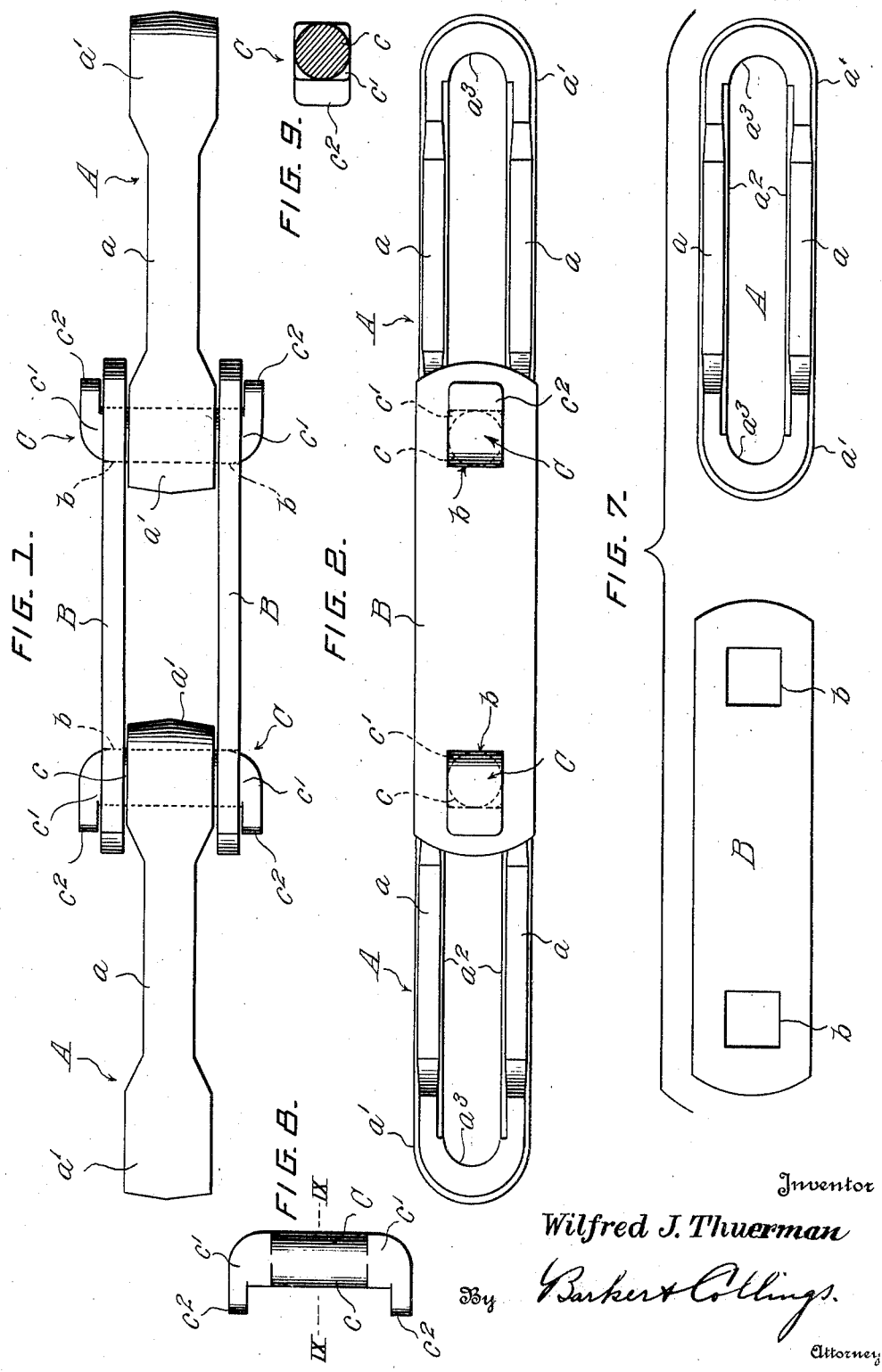
Inventor
Wilfred J. Thuerman
By Barker & Collings.
Attorney.

March 26, 1929.  W. J. THUERMAN  1,707,204
DRIVE AND POWER TRANSMITTING CHAIN
Filed March 27, 1928   2 Sheets-Sheet 2

Inventor
Wilfred J. Thuerman
By Barker & Collings
Attorneys

Patented Mar. 26, 1929.

1,707,204

UNITED STATES PATENT OFFICE.

WILFRED J. THUERMAN, OF MILWAUKEE, WISCONSIN, ASSIGNOR TO CHAIN BELT COMPANY, OF MILWAUKEE, WISCONSIN, A CORPORATION OF WISCONSIN.

DRIVE AND POWER-TRANSMITTING CHAIN.

Application filed March 27, 1928. Serial No. 265,024.

This invention relates to drive and power transmitting chains constructed to be used in connection with sprocket wheels wherein the links are of alternate construction, one being of the single bar, longitudinally slotted, type with narrow waist and thick ends, and the other of double bar or plate construction, the links being connected by removable pins, formed with heads that prevent separation of the links when they are in working position, and with non-circular intermediate portions that are engaged by the two bar or plate links. The pins are adapted to be rotated, when the links of the chain are turned to certain arbitrary positions, to permit the removal of the links therefrom and the separation of the parts of the chain for replacement or repair. Chains of this kind, which in their general characteristics are now quite common in the art, are especially adapted for heavy work and for use under conditions entailing excessive wear.

In the accompanying drawings illustrating the preferred form of my invention, Fig. 1 is a plan view of a section of chain comprising three links embodying my invention, the parts being in working relations.

Fig. 2 is a side view of the same.

Fig. 7 is a side elevation showing the two forms of links employed in constructing the chain, uncoupled and separated.

Fig. 8 is a plan view of the coupling pin employed to unite the links.
Fig. 9 is a transverse sectional view on the line IX—IX of Fig. 8.

Figure 3:
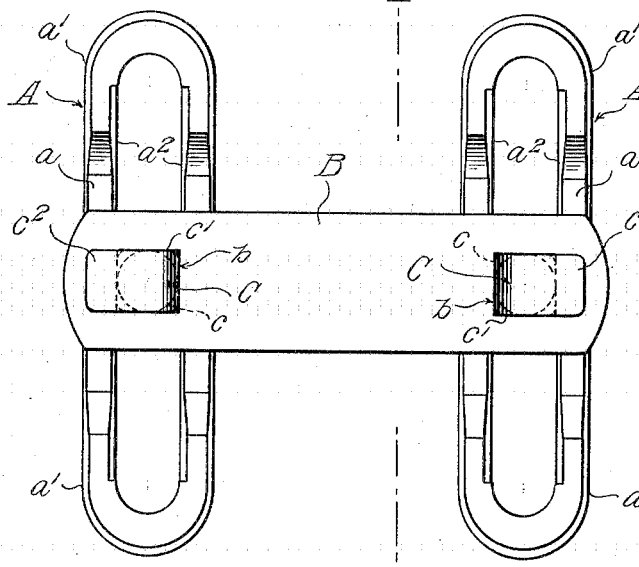
Fig. 3 is a side view showing the parts turned to arbitrary position preliminary to uncoupling.

Referring to the drawings:

A indicates a single bar link, links of this type alternating in the construction of the chain with the double plate links B. Each single bar link is formed with a narrow waist or middle portion $a$ and with thickened end portions $a'$. This link is longitudinally slotted as indicated at $a^2$, the ends $a^3$ of the slot constituting bearing seats for the connecting pins that hold together the links, the seats being curved so that the movements of articulation take place between the links A and the connecting pins C.

The plate links B are provided near each end with non-circular openings $b$, such openings being preferably square, and shaped to fit the portions of the connecting pins C that are engaged thereby.

The connecting pins are each formed with a central cylindrical portion $c$ that engages with a bearing or seat $a^3$ in a link A; with intermediate non-cylindrical portions $c'$, preferably square to fit the apertures $b$ in the plate links B; and with heads or lugs $c^2$. The latter extend laterally in one direction only from the non-cylindrical portions of the pin, and overlie the plate links B, as clearly represented in Figs. 1 and 2 when the chain is assembled for working operations, and they serve to prevent separation of the links. When the chain is properly coupled the lugs $c^2$ throughout the chain should be in line with each other—that is they all extend from the axes of articulation of the pins in the general direction of the length of the chain. These lugs may extend, as represented in the drawings, toward the ends of the links B, or towards their centers, but should not be arranged transversely of the links, except as shall presently be described, when the links of the chain are to be uncoupled.

It will be seen that, since the openings $b$ in the plate links B fit the intermediate portions $c'$ of the connected pins, the pins will turn with the links B, thus insuring that all movements of articulation shall be between the central cylindrical portions of the pins and the single bar links A.

It will also be seen that the links B do not have any longitudinal movement whatever relative to the connecting pins under any adjustment or condition in the normal working or operation of the chain. On the other hand, the links A may freely move longitudinally relative to the pins C with which they engage.

Figure 4:
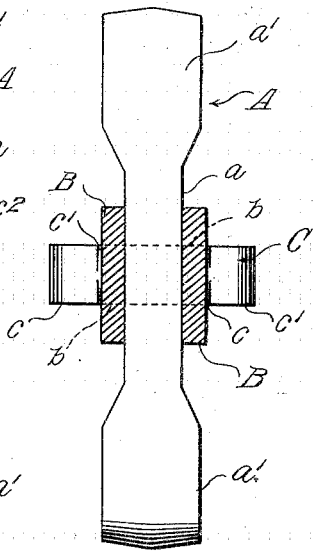
Fig. 4 is a sectional view taken on the line IV—IV of Fig. 3.
Figure 5:
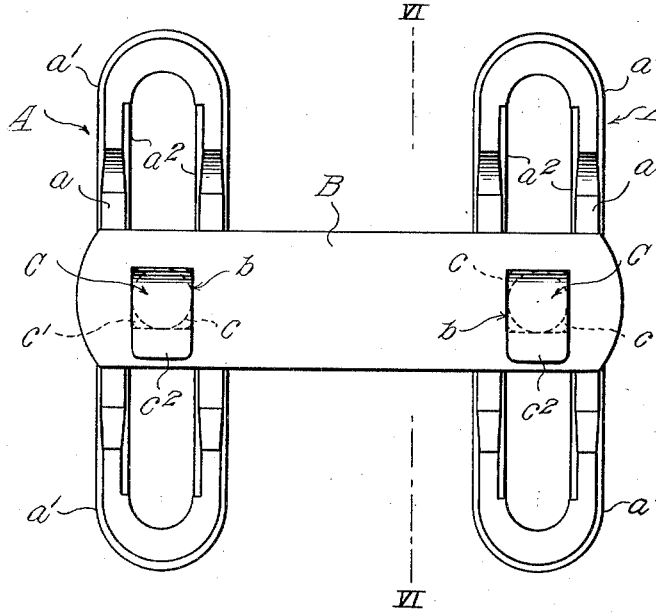
Fig. 5 is a view similar to Fig. 3 showing the connecting pins turned to position to permit the removal of the double plate links.
Figure 6:
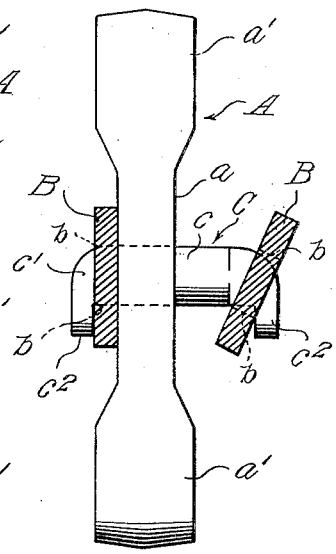
Fig. 6 is a transverse sectional view taken on the line VI—VI of Fig. 5, showing one of the plate links tilted for uncoupling.

When it becomes necessary or desirable to uncouple the chain, the links to be separated are first moved to the position indicated in Fig. 3, that is to say the links A are turned at right angles to the two bar or plate link B between them, and are then moved longitudinally relative to the pins uniting them with said two plate link, which brings the ends of the link B and the pins C engaging therewith opposite the waist portion *a* of the link A. The two plates of the link B are then moved toward each other as represented in Fig. 4. The two connecting pins at the opposite ends of the link B may now be turned to the positions indicated in Fig. 5, that is so that the lugs $c^2$ thereof are parallel with each other rather than in line with each other, as they are when the chain is coupled for working operations as will be apparent from a comparison of Figs. 3 and 5. This is possible because, when the plates B are moved toward each other as indicated in Fig. 4, the square or non-cylindrical portions $c^2$ of the pins are entirely outside of the faces of the plates B, and only the central cylindrical parts of the pins lie in the apertures *b* of the plates B and the central longitudinal slot or opening $a^2$ of the bar link A. The connecting pins being turned to the positions indicated in Fig. 5, a plate B may be tilted over the heads or lugs $c^2$, as represented in Fig. 6, and so removed. One of the plates being thus removed, the opposite one together with the pins engaging therewith may be easily separated from the links A, as is apparent.

The coupling of the links of the chain is effected by reverse movements to those that have just been described. It will be seen that a chain such as described is of simple construction, requiring only the bar links A, the plates B and the pins C, and these parts are of easy fabrication and of sturdy construction and great strength, as there is no undue weakening due to their fabrication and construction.

The parts may be easily assembled or dissembled and when once arranged in working position there is no practical liability of parts separating even though the chain becomes slack. Since the coupling pins cannot move in their seats *b* in the double plate links, and since the latter links can be removed from the pins only when the latter are turned to arbitrary positions bringing their lugs $c^2$ parallel with each other, and then only by a tilting movement of the plates B, it is practically impossible that there should be accidental separation or uncoupling of the chain.

What I claim is:

1. A sprocket chain comprising alternate single bar links and double plate links connected for articulation by pins, characterized by the pins having central cylindrical portions engaged by the single bar links, non-cylindrical portions near each end of each pin engaged by the plate links and heads or lugs at the extreme ends of the pins, the opposite lugs of each pin extending laterally in one direction only from the non-cylindrical parts of the pins, the plate links being provided with apertures shaped to correspond with the non-cylindrical portions of the pins, and the heads of the pins serving to hold the parts of the chain together when such parts are in normal working positions, and the pins being rotatable when the links are turned to arbitrary non-working positions to permit the plate links to be removed from the pins over the heads thereof by a tilting movement.

2. A sprocket chain comprising alternate single bar links and double plate links united for articulation by pins, the single bar links being longitudinally slotted and having narrow waist portions and thick end portions, the connecting pins having central cylindrical portions, non-cylindrical intermediate portions and end heads or lugs extending laterally in one direction only from the non-cylindrical portions of the pins, the central cylindrical parts of the pins being engaged by the single bar links, which are free to move relative to the pins, the double plate links having through them apertures which conform in shape to the non-cylindrical parts of the pins, whereby the plate links may not longitudinally move relative to the pins, and the heads of the pins holding the parts of the the chain together under working conditions, but, when turned to bring the lugs of adjacent pins parallel with each other, permitting the removal of the plate links by tilting movements thereof.

3. In a sprocket chain such as described comprising single bar links, double bar links, and connecting pins, the pins being rotatable in the single bar links but non-rotatable relative to the double plate links when in working position and being formed with heads extending laterally from the pins in one direction only, the pins being constructed and arranged so that their heads are in a line with each other when the chain is coupled for working use, thereby preventing separation of the parts, and being adapted to be turned so the heads of adjacent pins are parallel with each other when the links which they unite are moved to arbitrary positions, permitting the plate links to be removed from the pins by tilting movements.

WILFRED J. THUERMAN